July 20, 1937.   M. WINDELINCKX   2,087,493
CLUTCH CONTROL MECHANISM
Original Filed May 12, 1930
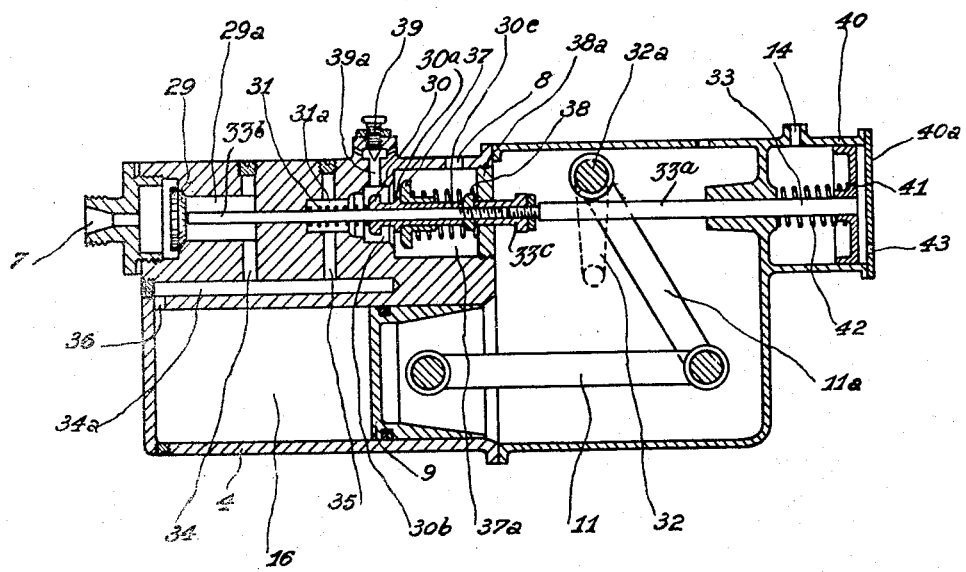

Patented July 20, 1937

2,087,493

UNITED STATES PATENT OFFICE 2,087,493

CLUTCH CONTROL MECHANISM

Maurice Windelinckx, Brussels, Belgium

Original application May 12, 1930, Serial No. 451,760. Divided and this application March 2, 1935, Serial No. 9,080. In France May 15, 1929

4 Claims. (Cl. 192—.01)

My invention relates to an automatic device for operating the clutch mechanism of a mechanically propelled vehicle.

In motor vehicles or other means of locomotion the object of the clutch is to couple or uncouple an engine to the transmission. This clutch is generally actuated by a pedal or by a hand lever.

The object of the present invention is to relieve the operator of this effort by providing a device making use of the vacuum existing in the intake manifold of an internal combustion engine.

According to the invention the pressure variations which occur in such a reduced pressure system according to the operating conditions of the engine are employed to actuate a distributor valve which serves to connect a vacuum servo-motor, for moving the clutch mechanism, either to a reduced pressure system or to the atmosphere.

This application is a division of my copending application for Letters Patent of the United States, Serial No. 451,760, filed May 12, 1930, under the provision of the International Convention.

The invention will be more particularly described with reference to the accompanying drawing, which is a longitudinal sectional view of apparatus constructed and arranged in accordance with my invention.

In accordance with this invention the distributor device is automatically operated by a piston acting under the effect of the vacuum which exists in the intake manifold of the engine and enables a slower or quicker action of the servo-motor in order to produce a slow and gradual clutching when the vehicle is started, or a quick clutching when shifting from one speed to another, the vehicle being in motion.

According to the present invention the operating means of the distributor comprises a cylinder 40 in which a piston 41 is mounted so as to be displaced against the tension of a spring 42 under the action of the vacuum existing in the intake manifold of the engine, which manifold communicates with the said cylinder 40 by means of a port 14. A port 43 provided in the head 40ª of the cylinder 40 is adapted to connect the space comprised behind the piston 41, between the latter and the head 40ª of the said cylinder, to the atmosphere.

A stem 33 is formed of two members 33ª and 33ᵇ, the adjacent ends of which are threaded and engaged in a tappet sleeve 33ᶜ so as to obtain a stem of adjustable length, which connects the piston to the distributor and terminates at its end remote from the piston 41 in a valve 29 whereby the chamber 16 of the servo-motor may be connected to the intake manifold of the engine through orifice 7, chamber 29ª, conduits 34, 34ª and port 36.

At a point approximately intermediate of the two ends of the stem 33, there is mounted, for longitudinal relative displacement, a valve 30 having one face subjected to the action of a return spring 31 and the other face abutting against a washer which in turn abuts the tapped sleeve 33ᶜ. The valve 30 has a tubular extension 30ᶜ provided with a collar 30ª forming an abutment for the longitudinally sliding valve 37 controlled by a return spring 38, which is abutted against a washer 38ª screwed in the valve housing of the cylinder 4.

A port 8 connects the chamber 37ª containing the valve 37 to the atmosphere. The chamber 30ᵇ containing the valve 30 communicates with the atmosphere by a conduit 39ª having an adjustable port controlled by a needle valve 39. The chamber 31ª communicates with the chamber 16 of the servo-motor through conduits 35, 34ª and port 36.

In the chamber 16 of the servo-motor there is reciprocally mounted a piston 9, connected to the clutch operating fork 32 by means of the rod 11, one end of which is connected to said piston, while the other end of the rod is hinged to one end of a lever 11ª keyed onto a shaft 32ª supporting the said fork.

The above described device is operated as follows:

When the vehicle is stopped, and the throttle is in a position for the slow running speed of the engine, a maximum vacuum will be produced in the intake pipe of the carburetor. This maximum vacuum will also be produced in the cylinder 40 which is connected to the intake of the carburetor through the port 14, said vacuum acting to pull the piston 41 towards the left (when considering the drawing) and this piston will take with it the operating stem 33 for the valves 30 and 37, thus closing these valves and opening the valve 29 so as to connect the chamber 16 to the intake manifold of the engine through port 7, chamber 29ª, ducts 34 and 34ª and port 36.

The vacuum in the chamber 16 will cause the piston 9 of the servo-motor to travel towards the left, and this piston will take with it rod 11, lever 11ª, shaft 32ª and fork 32, thus disengaging the engine clutch.

To start the vehicle by a smooth and gradual clutching, the driver, after having engaged the gear shifting lever, pushes on the accelerator of the engine in a smooth and gradual manner. The vacuum in the intake manifold decreases slowly in proportion as the carburetor throttle is opened, thus causing a decrease of the vacuum in the cylinder 40. Owing to this slow decrease of vacuum, the piston 41, under the resilient action of the return spring 42, will move towards the right taking with it the stem 33. The displacement of the latter is first effective in opening the valve 30, thus connecting the chamber 16 of the servo-motor to the atmosphere through the conduit 39a having an inlet port restricted by the needle valve 39. The gradual admission of air into the chamber 16 causes the piston to slowly return to its right hand position, thus smoothly engaging the clutch connected therewith.

The vacuum decreasing in proportion as the driver opens the throttle, the valve 30 will be caused to open to a greater extent, and while so doing will abut with its lug 30a against the valve 37, thus causing the latter to open. The opening of the valve 37 results in a rapid flow of air into the chamber 16, and in a final engagement of the clutch, the vacuum valve 29 being closed by the movement of rod 33 to the right.

To disengage or to engage the clutch quickly, such as when shifting from one speed to another, the device is operated as follows:

The accelerator pedal is suddenly released so as to produce a maximum vacuum in the intake manifold of the engine and in the chamber 40 of the servo-motor. The piston 41 will under the action of this vacuum produce a quick closing of the air valves 37 and 30 and opening of the valve 29, thus causing the clutch to disengage. After having shifted to the desired speed the driver quickly pushes down the accelerator pedal thus reducing to a minimum the effect of the vacuum on the piston 41, which results in immediately opening the air valves 30 and 37 and closing the valve 29, so as to cause a rapid clutch engagement.

The invention thus covers the principle of automatic declutching by the sole effect of the increase in vacuum in the intake manifold of the engine when communication between the said intake manifold and the carburetor has been throttled sufficiently by releasing the accelerator pedal partly or entirely.

Having thus described my invention, what I claim is:

1. In an automatic clutch operating mechanism for motor vehicles having a source of vacuum, a servo-motor cylinder, a servo-motor piston in the cylinder connected to the clutch operating member, a distributor device for controlling the partial vacuum in the servo-motor cylinder and means for operating the distributor device in dependence upon the degree of vacuum in the vacuum source of the engine produced by the different positions of the carburetor throttle valve and the speed of the engine, said means comprising an operating cylinder, an operating piston in said cylinder having one face subjected to the sub-atmospheric pressure and the other face subjected to the atmospheric pressure, a resilient means acting on said operating piston in a direction opposite to that of the sub-atmospheric pressure, an adjustable valve stem extending from the said operating piston, a valve on said valve stem connecting the said servo-motor cylinder to the source of vacuum when the said operating piston is moved by the difference in pressure between the sub-atmosphere and the atmosphere due to the closure of the carburetor throttle, a restricted air inlet to the distributor device, a second valve on said valve stem connecting the said servo-motor cylinder to the atmosphere through the said restricted air inlet when the operating piston is pushed back by the said resilient means, the carburetor throttle valve being opened, and means for a gradual control of the connection between the servo-motor cylinder and the atmosphere.

2. In an automatic clutch operating mechanism for motor vehicles having a source of vacuum, a servo-motor cylinder, a servo-motor piston in the cylinder connected to the clutch operating member, a distributor device for controlling the partial vacuum in the servo-motor cylinder and means for operating the distributor device in dependence upon the degree of vacuum in the vacuum source of the engine produced by the different positions of the carburetor throttle valve, said means comprising an operating cylinder, an operating piston in said cylinder having one face subjected to the sub-atmospheric pressure and the other face subjected to the atmospheric pressure, a resilient means acting on said operating piston in a direction opposite to that of the sub-atmospheric pressure, an adjustable valve stem extending from the said operating piston, a valve on said valve stem connecting the said servo-motor cylinder to the source of vacuum when the said operating piston is moved by the difference in pressure between the sub-atmosphere and the atmosphere due to the closure of the carburetor throttle, a restricted air inlet to the distributor device, a second valve on said valve stem connecting the said servo-motor cylinder to the atmosphere through the said restricted air inlet when the operating piston is pushed back by the said resilient means, the carburetor throttle valve being opened, and the degree of vacuum decreased in the air exhauster, a second non-restricted air inlet to the distributor device, a third valve interposed between the said non-restricted air inlet and the servo-motor cylinder, a resilient member acting on the said third valve in the direction of closure, and a lug on the said second valve positioned to open the said third valve when the said second valve has been opened to some extent.

3. In an automatic clutch operating mechanism for motor vehicle having a source of vacuum, a servo-motor cylinder, a servo-motor piston in the cylinder connected to the clutch operating member, a distributor device for controlling the partial vacuum in the servo-motor cylinder, a chamber in communication with the source of vacuum, a movable wall in said chamber, means for connecting said movable wall to said distributor for displacing the latter by differential pressure created by the presence of atmospheric pressure on one face of said movable wall and sub-atmospheric pressure on the other face of the movable wall, and resilient means acting on said movable wall in a direction opposite to that of the vacuum.

4. In an automatic clutch operating mechanism according to claim 3, means for regulating the velocity of movement of the servo-motor piston, in the clutch engaging direction.

MAURICE WINDELINCKX.